United States Patent
Nowatari

(10) Patent No.: US 10,995,858 B2
(45) Date of Patent: May 4, 2021

(54) SEAL STRUCTURE AND MANUFACTURING METHOD THEREOF

(71) Applicant: IIDA Co., Ltd., Kanagawa (JP)

(72) Inventor: Shuichi Nowatari, Kanagawa (JP)

(73) Assignee: IIDA CO., LTD., Kanagawa (JP)

( * ) Notice: Subject to any disclaimer, the term of this patent is extended or adjusted under 35 U.S.C. 154(b) by 0 days.

(21) Appl. No.: 16/318,693

(22) PCT Filed: Oct. 11, 2017

(86) PCT No.: PCT/JP2017/036851
§ 371 (c)(1),
(2) Date: Jan. 17, 2019

(87) PCT Pub. No.: WO2018/083955
PCT Pub. Date: May 11, 2018

(65) Prior Publication Data
US 2019/0249777 A1    Aug. 15, 2019

(30) Foreign Application Priority Data

Nov. 1, 2016   (JP) .............................. JP2016-214388

(51) Int. Cl.
F16J 15/24    (2006.01)
F16J 15/26    (2006.01)
(Continued)

(52) U.S. Cl.
CPC .............. *F16J 15/24* (2013.01); *F16J 15/18* (2013.01); *F16J 15/185* (2013.01); *F16J 15/187* (2013.01);
(Continued)

(58) Field of Classification Search
CPC .......... F16J 9/04; F16J 9/12; F16J 9/20; F16J 9/3224; F16J 15/24; F16J 15/18;
(Continued)

(56) References Cited

U.S. PATENT DOCUMENTS 1,044,787 A  *  11/1912  Klingloff ................. F16J 15/28
                                                            277/533
1,666,805 A  *   4/1928  Williams .............. F16B 13/065
                                                             411/18
(Continued)

FOREIGN PATENT DOCUMENTS

CN        101196240 A     6/2008
JP        H06-011044 A    1/1994
(Continued)

OTHER PUBLICATIONS

International Search Report and Written Opinion for PCT/JP2017/036851 dated Jan. 9, 2018.

*Primary Examiner* — Vishal A Patel
(74) *Attorney, Agent, or Firm* — Kenealy Vaidya LLP

(57) ABSTRACT

This seal structure 1 is provided with an annular seal member 2, a shaft member 4 having a seal groove 5 where the inner peripheral side of said seal member 2 is arranged, and an inner peripheral wall member 6 which has an internal space surrounded by an inner peripheral wall 61, wherein the shaft member 4 is arranged in the internal space 62, and the annular seal member 2 is arranged in the seal groove 5 of the shaft member 4. The side of the outer periphery 21 of the annular seal member 2 is formed by overlapping, in the axial direction D1, a plurality of ring-shape parts 3 which are closed or unclosed when viewed in a radial direction D2; when viewed in the radial direction D2, on one side of a center axis C1 of the annular seal member 2, in a longitudinal cross-section of the plurality of ring-shape parts 3, one corner 32 of the two corners of the edge 31 facing the inner peripheral wall 61 of the inner peripheral wall member 6 contacts the inner peripheral wall 61 of the inner peripheral wall member 6.

5 Claims, 11 Drawing Sheets

(51) Int. Cl.
 *F16J 15/18* (2006.01)
 *F16J 15/20* (2006.01)
 *F16J 15/56* (2006.01)

(52) U.S. Cl.
 CPC ............... *F16J 15/20* (2013.01); *F16J 15/26* (2013.01); *F16J 15/56* (2013.01)

(58) Field of Classification Search
 CPC .......... F16J 15/185; F16J 15/187; F16J 15/20; F16J 15/26; F16J 15/56
 See application file for complete search history.

(56) References Cited

U.S. PATENT DOCUMENTS

| | | | | | |
|---|---|---|---|---|---|
| 1,727,732 | A | * | 9/1929 | Ryan | F16J 15/28 277/528 |
| 2,851,291 | A | * | 9/1958 | Payne | F16J 15/38 277/394 |
| 3,582,093 | A | * | 6/1971 | Lucien | F16J 15/166 277/434 |
| 3,945,649 | A | * | 3/1976 | Nakamura | F16J 15/20 277/417 |
| 3,967,525 | A | * | 7/1976 | Lerich | F16B 13/0883 411/69 |
| 4,192,517 | A | * | 3/1980 | Torres | E21B 33/08 277/329 |
| 4,302,020 | A | * | 11/1981 | Morales | F16J 15/28 277/530 |
| 4,324,407 | A | * | 4/1982 | Upham | E21B 33/1212 277/336 |
| 4,363,465 | A | * | 12/1982 | Morrill | F16K 41/04 137/246.12 |
| 4,451,047 | A | * | 5/1984 | Herd | F16J 15/183 251/214 |
| 4,609,146 | A | * | 9/1986 | Walto | B05B 15/74 239/123 |
| RE32,295 | E | * | 11/1986 | Braid | C07F 5/04 508/195 |
| 6,182,755 | B1 | * | 2/2001 | Mansure | E21B 33/1208 166/180 |
| 6,305,265 | B1 | * | 10/2001 | Bingham | F04B 15/08 277/452 |
| 9,243,713 | B2 | * | 1/2016 | Miura | F16J 15/166 |
| 9,328,825 | B2 | * | 5/2016 | Tones | F16J 15/24 |
| 2008/0136118 | A1 | | 6/2008 | Ando et al. | |
| 2012/0211948 | A1 | * | 8/2012 | Koda | F01N 13/1827 277/626 |
| 2013/0213221 | A1 | * | 8/2013 | Jenness | F16J 9/04 92/208 |

FOREIGN PATENT DOCUMENTS

| | | |
|---|---|---|
| JP | 2013-053640 A | 3/2013 |
| JP | 2017-078503 A | 4/2017 |

* cited by examiner

FIG. 4
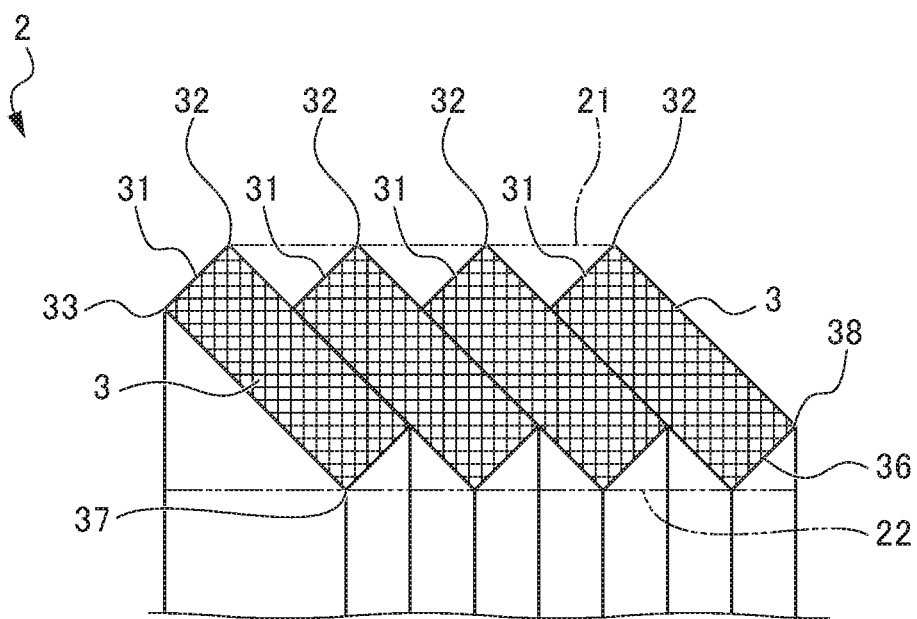
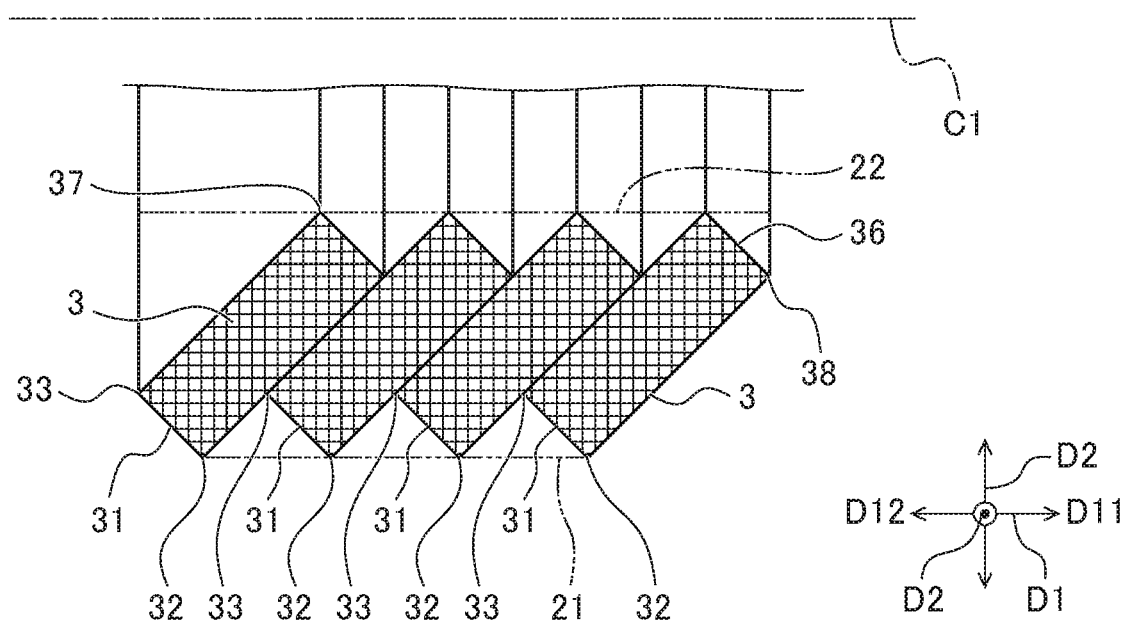

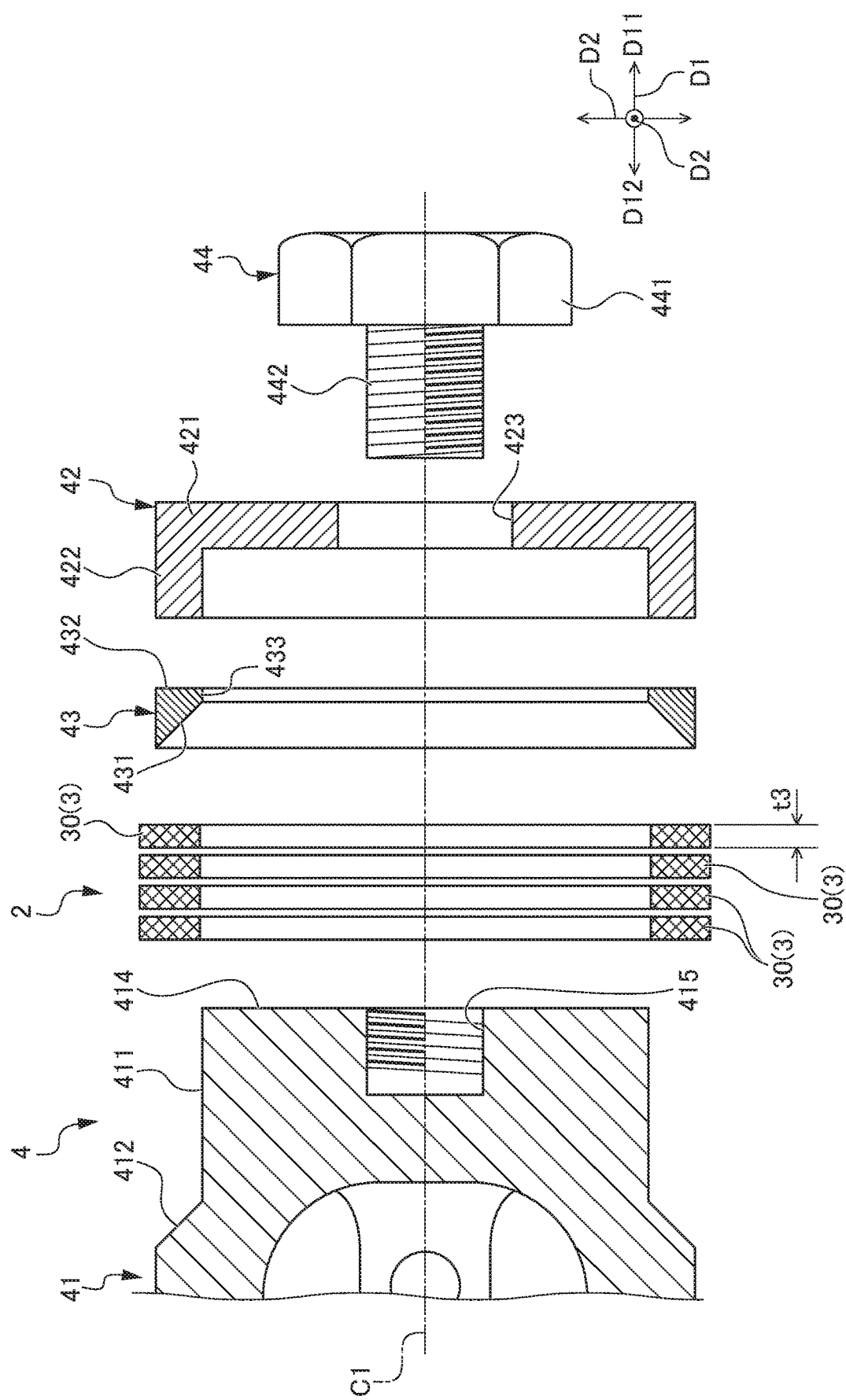

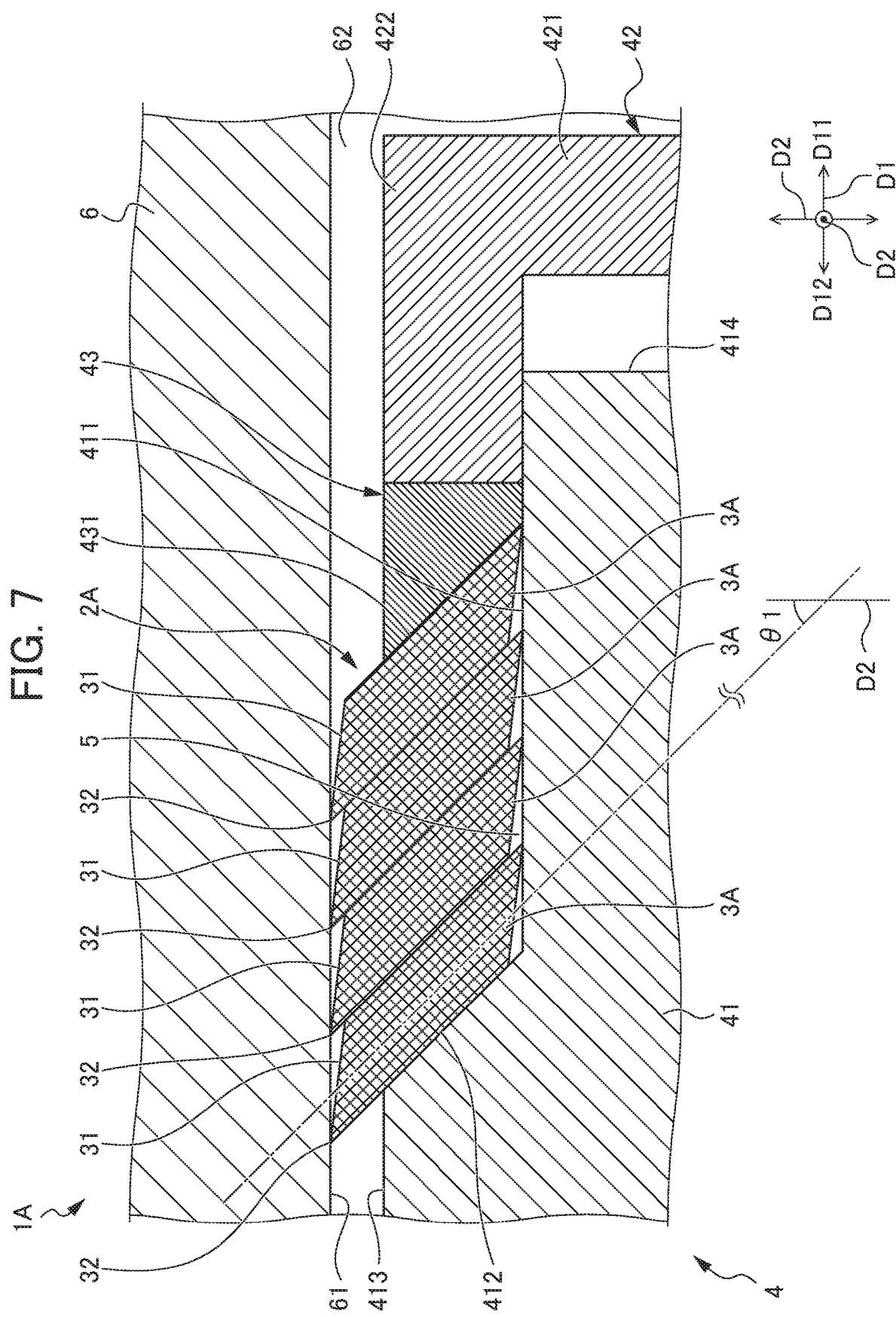

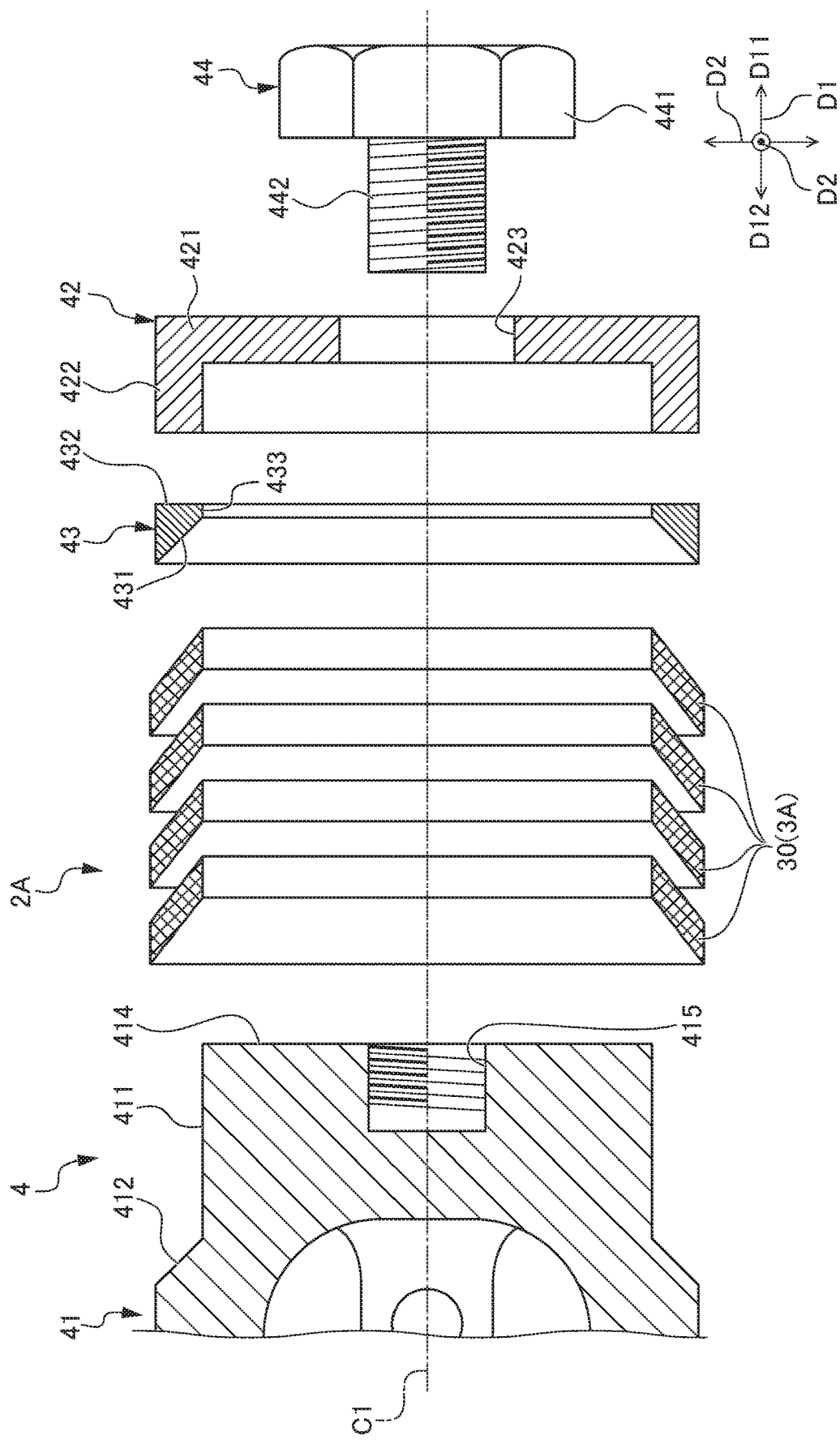

US 10,995,858 B2

SEAL STRUCTURE AND MANUFACTURING METHOD THEREOF

This application is a U.S. national phase filing under 35 U.S.C. § 371 of PCT Application No. PCT/JP2017/036851, filed Oct. 11, 2017, and claims priority under 35 U.S.C. § 119 to Japanese patent application number JP2016-214388 filed on Nov. 1, 2016, the entireties of which are incorporated herein by reference.

TECHNICAL FIELD

The present invention establishes a seal structure that seals an internal space formed by an inner peripheral wall member and a shaft member by an annular seal member.

BACKGROUND ART

The seal structure by an annular seal member is used in various fields such as valves, hydraulic devices, and the engine of an internal combustion engine. In relation to the engine of an internal combustion engine, Cited Document 1 describes a seal ring having an inner peripheral surface, outer peripheral surface and lateral surface, and consisting of an elastic body with a quadrangular cross-section. By installing the seal ring in a ring groove by causing to elastically deform so that both lateral surfaces thereof become conical surfaces, it is said that the corner of the inner peripheral surface of the seal ring and the bottom surface of the seal groove make line contact, and the corner of the outer peripheral surface of the seal ring and the inner peripheral surface of the cylinder make line contact.

Patent Document 1: Japanese Unexamined Patent Application, Publication No. 2013-053640

DISCLOSURE OF THE INVENTION

Problems to be Solved by the Invention

The seal structure described in Patent Document 1 is a single stage lip sealing in which the seal portion is only one location at one side relative to the central axis in a longitudinal cross-sectional view. For this reason, it has been desired to manufacture to obtain even higher sealing property with a relatively easy processing method.

Therefore, the present invention has an object of providing a seal structure with which high sealing property is obtained by forming a plurality of contact types close to line contact between the outer periphery of an annular seal member and an inner peripheral wall member, and which is capable of being manufactured by a relatively easy processing method, as well as a manufacturing method thereof.

Means for Solving the Problems

The present invention relates to a seal structure comprising an annular seal member of ring shape having an outer periphery and an inner periphery; a shaft member having a seal groove in which a side of the inner periphery of the annular seal member is disposed; an inner peripheral wall member having an internal space encircled by the inner peripheral wall, and arranging in the internal space the shaft member in which the annular seal member is disposed in the seal groove, in which at least a side of the outer periphery of the annular seal member is formed by a plurality of ring-shaped parts, which are closed or unclosed when viewed in a radial direction orthogonal to an axial direction of the annular seal member, overlapping in the axial direction, and in which one corner among two corners, which include an edge opposing the inner peripheral wall of the inner peripheral wall member in a longitudinal cross-section of a plurality of the ring-shaped parts at one side relative to a central axis of the annular seal member when viewing in the radial direction of the annular seal member, is abutting the inner peripheral wall of the inner peripheral wall member.

In addition, the longitudinal cross-section of the ring-shaped part may be a quadrangle which spans from the outer periphery of the annular seal member to the inner periphery and slopes relative to the radial direction.

Furthermore, a side opposing the inner peripheral wall of the inner peripheral wall member in the longitudinal cross-section of a plurality of the ring-shaped parts when viewed in the radial direction of the annular seal member may be sloping relative to the axial direction.

Moreover, the annular seal member may consist of fluororesin.

The present invention relates to a manufacturing method of a seal structure that includes: an annular seal member of ring shape having an outer periphery and an inner periphery; a shaft member having a seal groove in which a side of the inner periphery of the annular seal member is disposed; an inner peripheral wall member having an internal space encircled by the inner peripheral wall, and arranging in the internal space the shaft member in which the annular seal member is disposed in the seal groove, in which at least a side of the outer periphery of the annular seal member is formed by a plurality of ring-shaped parts, which are closed or unclosed when viewed in a radial direction orthogonal to an axial direction of the annular seal member, overlapping in the axial direction; the method including compressing in the axial direction the ring-shaped part in a state in which a side opposing the inner peripheral wall of the inner peripheral wall member is parallel to the inner peripheral wall of the inner peripheral wall member, in a longitudinal cross-section of a plurality of the ring-shaped parts, at one side relative to a central axis of the annular seal member, when viewed in the radial direction of the annular seal member, thereby forming the ring-shaped part in a state in which one corner among two corners, which include an edge opposing the inner peripheral wall of the inner peripheral wall member in the longitudinal cross-section of a plurality of the ring-shaped parts when viewed in the radial direction of the annular seal member, is abutting the inner peripheral wall of the inner peripheral wall member.

The longitudinal cross-section of the ring-shaped part may be a quadrangle which spans from the outer periphery of the annular seal member to the inner periphery and slopes relative to the radial direction.

In addition, the annular seal member may consist of fluororesin.

Effects of the Invention

According to the present invention, it is possible to provide a seal structure with which high sealing property is obtained by forming a plurality of contact types close to line contact between the outer periphery of an annular seal member and an inner peripheral wall member, and which is capable of being manufactured by a relatively easy processing method, as well as a manufacturing method thereof.

BRIEF DESCRIPTION OF THE DRAWINGS

FIG. 4 is a longitudinal cross-sectional view virtually showing only the annular seal member 2 in a state arranged in a seal groove 5 of the shaft member 4;

FIG. 5 is an exploded sectional view of the seal structure 1 of the first embodiment;

FIG. 7 is a partially enlarged view of a longitudinal cross-section of a seal structure 1A according to a second embodiment of the present invention (view corresponding to FIG. 2);

FIG. 8 is an exploded cross-sectional view of the seal structure 1A of the second embodiment (view corresponding to FIG. 5);

PREFERRED MODE FOR CARRYING OUT THE INVENTION

First Embodiment

Figure 1:
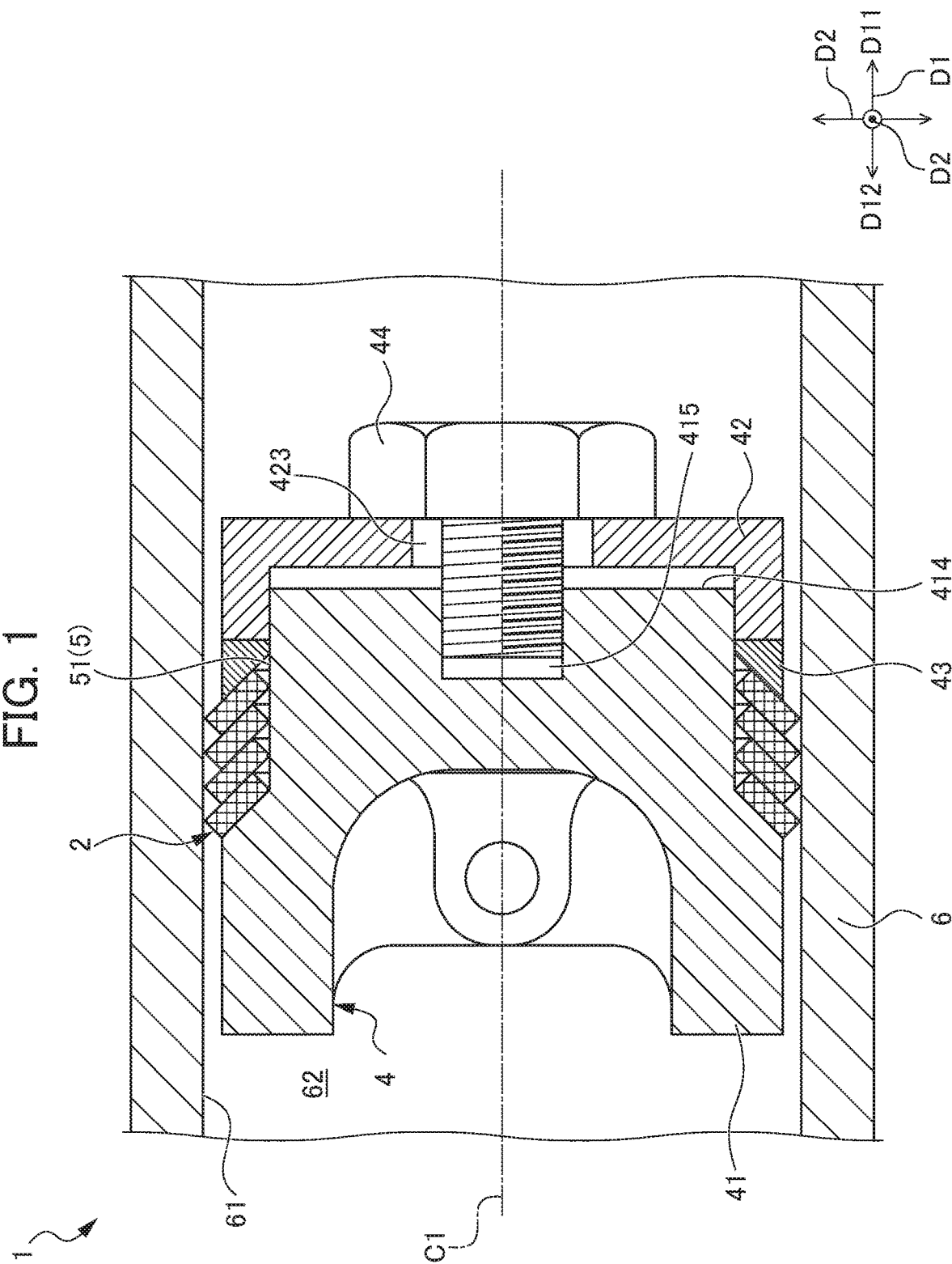
FIG. 1 is a longitudinal cross-sectional view of a seal structure 1 according to a first embodiment of the present invention.
Figure 2:
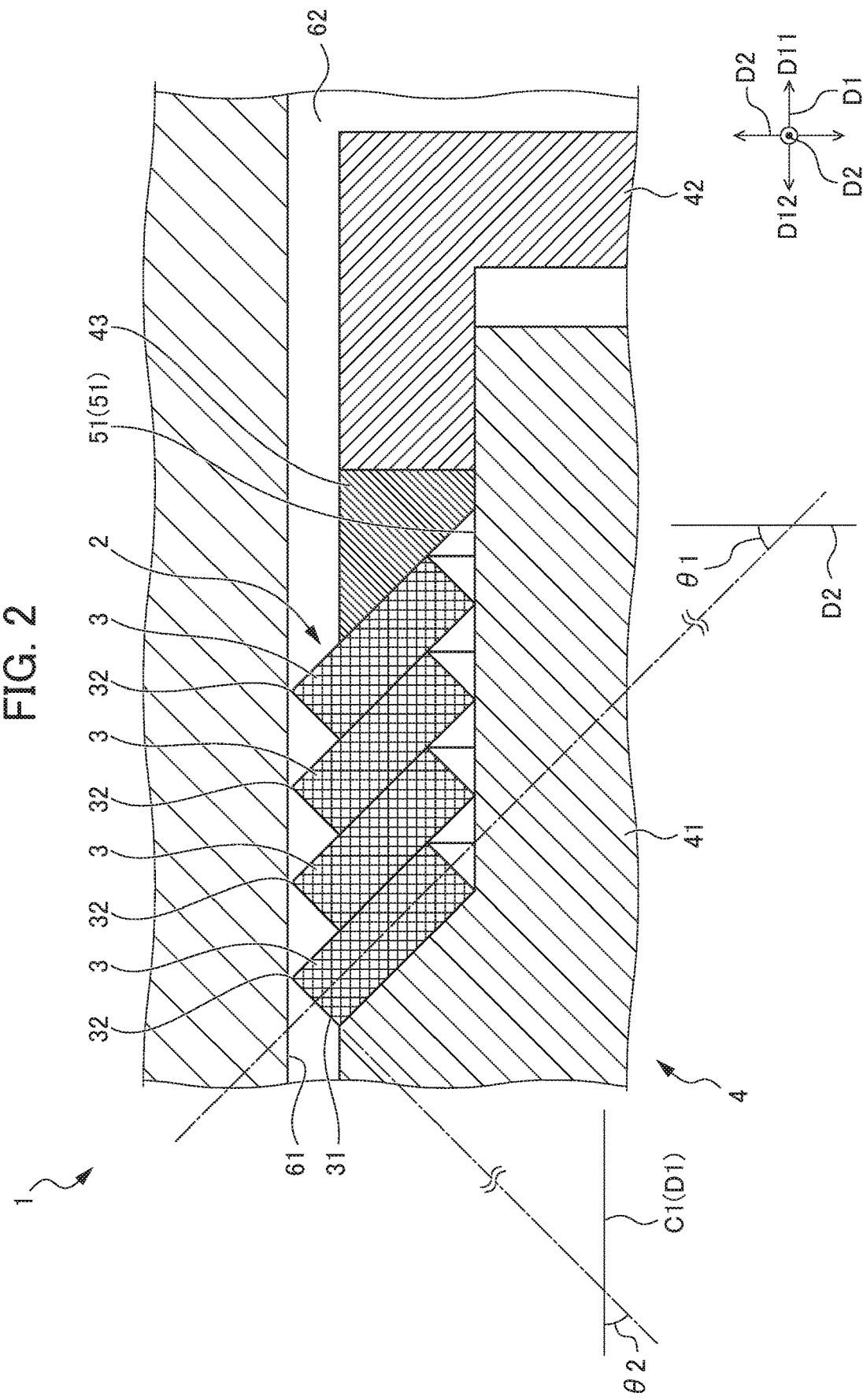
FIG. 2 is a partially enlarged view of FIG. 1.
Figure 3:
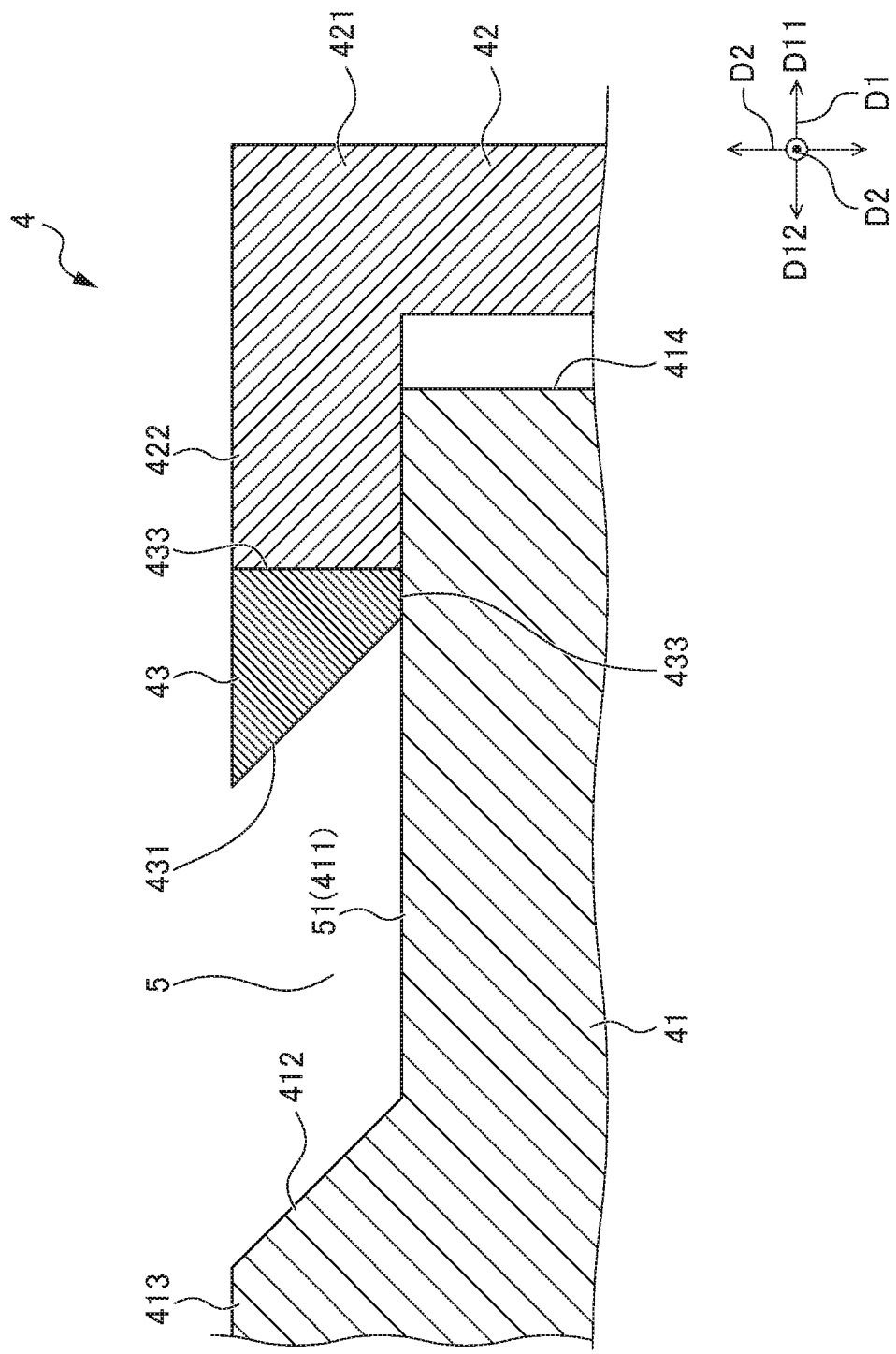
FIG. 3 is a longitudinal cross-sectional view showing a shaft member 4 in a state virtually excluding an annular seal member 2.

A seal structure 1 according to a first embodiment of the present invention will be explained by referencing the drawings. FIG. 1 is longitudinal cross-sectional view of the seal structure 1 according to the first embodiment of the present invention. FIG. 2 is a partially enlarged view of FIG. 1. FIG. 3 is a longitudinal cross-sectional view showing a shaft member 4 in a state virtually excluding an annular seal member 2. FIG. 4 is a longitudinal cross-sectional view virtually showing only the annular seal member 2 in a state arranged in a seal groove 5 of the shaft member 4. FIG. 5 is an exploded sectional view of the seal structure 1 of the first embodiment.

The seal structure of the present invention can be applied to various technologies such as valves, hydraulic devices, and the engine of an internal combustion engine. As shown in FIGS. 1 to 5, the seal structure 1 of the first embodiment includes an annular seal member 2 of ring shape having an outer periphery 21 (refer to FIG. 4) and an inner periphery 22 (refer to FIG. 4), a shaft member 4, and an inner peripheral wall member 6. The shaft member 4, annular seal member 2 and inner peripheral wall member 6 have an axial direction D1 and a radial direction D2. The axial direction D1 is a longitudinal direction of the shaft member 4. The radial direction D2 is a direction orthogonal to the axial direction D1, and extends radially from the axial direction D1.

Shaft Member 4

As shown in FIGS. 1 to 3, the shaft member 4, at an outer periphery thereof, has a seal groove 5 into which a side on the inner periphery 22 of the annular seal member 2 is arranged. The seal groove 5 has a groove bottom 51 at which the outer diameter is constant along the axial direction D1. It should be noted that, for the axial direction D1, the direction from a first main body 41 described later towards a second main body 42 is referred to as the first axial direction D11, and the opposite direction thereto is referred to as the second axial direction D12.

The shaft member 4 includes the first main body 41, the second main body 42, a sloped compression ring 43 and a second joining member 44. The first main body 41 has a stepped shape in which a side in the first axial direction D11 forms a small diameter part 411. The first main body 41 has the small diameter part 411 at the side in the first axial direction D11, has a large diameter part 413 at a side in the second axial direction D12, and has a step surface 412 between the small diameter part 411 and large diameter part 413. The small diameter part 411 is columnar shape. The step surface 412 slopes so as to form an acute angle (<90 degrees) with the second axial direction D12 in the longitudinal cross-sectional view, thereby linking the small diameter part 411 and large diameter part 413. The step surface 412 abuts the side in the second axial direction D12 of the annular seal member 2 arranged in the seal groove 5 of the shaft member 4. It should be noted that the transverse section of the large diameter part 413 is not limited to round shape. The first main body 41 has a first joint 415 at one end face 414 on a side in the first axial direction D11. The first joint 415 in the present embodiment consists of a female thread part.

The second main body 42 includes a radial extended part 421, axial extended part 422, and male-thread-part through hole 423. The radial extended part 421 extends in the radial direction D2 so as to cover the one end face 414 of the first main body 41. The radial extended part 421 is a disk shape having the male-thread-part through hole 423 at the central part thereof. The axial extended part 422 extends from the outer periphery of the radial extended part 421 to the second axial direction D12. The axial extended part 422 is a cylindrical shape. The male-thread-part through hole 423 is provided in a central part of the radial extended part 421. In the male-thread-part through hole 423, a male thread part 442 (described later) of the second joining member 44 is arranged in a penetrated state.

The sloped compression ring 43 is an annular member, and has a sloped face 431 at a side thereof in the second axial direction D12, has a second abutting face 432 at a side thereof in the first axial direction D11, and has an inner circumferential face 433 at the inside thereof in the radial direction D2. The sloped face 431 slopes so as to form an acute angle (<90 degrees) with the second axial direction D12. The sloped face 431 compresses the side in the first axial direction D11 of the annular seal member 2 arranged in the seal groove 5 of the shaft member 4 to the second axial direction D12. In detail, the sloped face 431 compresses a region on an inner diameter side in the radial direction D2 of the surface of the ring shaped part 3 on the side in the first axial direction D11. The second abutting face 432 is compressed to the second axial direction D12 by the axial extended part 422 of the second main body 42. The inner circumferential face 433 abuts or approaches the small diameter part 411 of the first main body 41.

The second joint member 44 consists of male threads, and includes a head part 411 and male thread part 442. The head part 441 does not pass through the male-thread-part through hole 423 due to being thicker than the male-thread-part through hole 423 of the second main body 42. The male thread part 442 can pass through the male-thread-part through hole 423 due to being thinner than the male-thread-part through hole 423 of the second main body 42. The head part 441 compresses, in the second axial direction D12, the surface of the radial extended part 421 of the second main body 42 on the side in the first axial direction D11. The male thread part 442 penetrates the male-thread-part through hole 423 of the second main body 42, and joins (threads together) with the first joint 415 of the first main body 41.

In a state joining the first joint 415 (female thread part) of the first main body 41 and the male thread part 442 of the second joining member 44, the seal groove 5 is formed by the step surface 412 and small diameter part 411 of the first main body 41, and the sloped face 431 of the sloped compression ring 43. The longitudinal cross-section of the seal groove 5 is a parallelogram. One group of two sides among the four sides of the parallelogram extends in the axial direction D1. The other group of two sides slopes so as to form an acute angle (<90 degrees) with the second axial direction D12.

Inner Peripheral Wall Member 6

The inner peripheral wall member 6 has an internal space encircled by the inner peripheral wall 61. The inner peripheral wall 61 and internal space 62 extend in the axial direction D1. A cross section of the inner peripheral surface of the inner peripheral wall 61 is circular form. Therefore, the cross section of the outer circumference of the internal space 62 is also circular form. The shaft member 4 at which the annular seal member 2 is arranged in the seal groove 5 is disposed in the internal space 62.

Annular Seal Member 2

The annular seal member 2 is formed by overlapping in the axial direction D1 a plurality of ring-shaped parts 3 which are closed when viewed in the radial direction D2. The number of ring-shaped parts 3 forming one annular seal member 3 is 3 to 10. In the present embodiment, the ring-shaped part 3 which is closed when viewed in the radial direction D2 consists of a member of ring shape which actually links annularly, as shown in FIG. 5. On one side relative to the central axis C1 of the annular seal member 2, shaft member 4 and inner peripheral wall member 6, the longitudinal cross-section of the ring-shaped part 3 is a quadrangle, in detail, a rectangle.

"On one side relative to the central axis C1" can also be perceived as "case of focusing on one side relative to the central axis C1". In the present embodiment, the longitudinal cross-section of the ring-shaped part 3 is a quadrangle (rectangle) spanning from the outer periphery 21 of the annular seal member 2 to the inner periphery 22 and sloping relative to the radial direction D2. For the rectangular ring-shaped part 3, the thickness t3 in the axial direction D1 (refer to FIG. 5) is 1 to 3 mm, for example.

As shown in FIG. 2, on one side relative to the central axis C1 of the annular seal member 2, the longitudinal cross-section of the ring-shaped part 3 slopes relative to the radial direction D2. In the present embodiment, the longitudinal cross-section of the ring-shaped part 3 slopes so as to form a slope angle θ1 which is an acute angle (<90 degrees) with the radial direction D2. The slope angle θ1 is 10 to 80 degrees, for example, and is preferably 30 to 60 degrees.

By a plurality of the ring-shaped parts 3 sloping in this way, the annular seal member 2 is formed. Since the ring-shaped part 3 is sloping, in the longitudinal cross-sectional view of the ring-shaped part 3, the outer peripheral edge (side) 31 opposing the outer circumference of the ring-shaped part 3 is sloping so as to form a slope angle θ2(=θ1) which is an acute angle (<90 degrees) with the second axial direction D12. In other words, when viewing in the radial direction D2 of the annular seal member 2, the outer peripheral edge 31 opposing the inner peripheral wall 61 of the inner peripheral wall member 6 in the longitudinal cross-section of the plurality of ring-shaped parts 3 is sloping relative to the axial direction D1.

Since the outer peripheral edge 31 is sloping in this way, only one corner 32 including the outer peripheral edge 31 in the longitudinal cross-sectional view is abutting the inner peripheral wall 61 of the inner peripheral wall member 6. In other words, when viewing in the radial direction D2 of the annular seal member 2, the one corner 32 among the two corners including the outer peripheral edge 31, which opposes the inner peripheral wall 61 of the inner peripheral wall member 6 in the longitudinal cross-section of the plurality of ring-shaped parts 3, is abutting the inner peripheral wall 61 of the inner peripheral wall member 6. The one corner 32 of the plurality of ring-shaped parts 3 forms the outer periphery 21 of the annular seal member 2. In each of the ring-shaped parts 3, a seal in a contact state close to line contact in the longitudinal cross-sectional view is formed by the corner 32. Therefore, a plurality of seals in a contact state close to line contact in the longitudinal cross-sectional view is formed by the one corners 32 of the plurality of ring-shaped parts 3. Such a seal is formed over the entire periphery in the circumferential direction.

It should be noted that the other corner 33 including the outer peripheral edge 31 (refer to FIG. 4) is not abutting the inner peripheral wall 61 of the inner peripheral wall member 6. In the inner peripheral side 36, which is the opposite side to the outer peripheral edge 31, the corner 37 that is the opposite corner to the one corner 32 of the outer peripheral edge 31 (refer to FIG. 4) is abutting the small diameter part 411 of the first main body 41 of the shaft member 4. The plurality of corners 37 forms the inner periphery 22 of the annular seal member 2. In addition, the corner 38 which is the opposite corner to the other corner 33 of the outer peripheral edge 31 (refer to FIG. 4) is not abutting the small diameter part 411 of the first main body 41 of the shaft member 4.

It should be noted that, as shown in FIG. 5, in a state in which the ring-shaped part 3 is not arranged in the seal groove 5, the ring-shaped part 3 is not sloping relative to the radial direction D2 in the longitudinal cross-sectional view, and extends in the radial direction D2. The ring-shaped part 3 in such a state is referred to as "ring-shaped part 30" as appropriate. Such a ring-shaped part 30 is obtained by cutting cylindrical material into a slice.

In the present embodiment, the annular seal member 2 (ring-shaped part 3) consists of fluororesin. As the fluororesin, PTFE, PFA and FEP are exemplified. The fluororesin is superior in various characteristics such as chemical resistance, electrical insulation property, heat resistance, low friction property (self-lubricating property), and machinability, and compared to metal or common resins, is suited as the annular seal member 2. It should be noted that the resin forming the annular seal member 2 may be a resin other than fluororesin. As the resin other than fluororesin, for example, PEEK, urethane, carbon-containing resin, rubber, various self-lubricating resins, and various engineering plastics can be exemplified. In addition, the annular seal member 2 may be formed from fiber materials. Carbon fiber materials can be exemplified as the fiber material. The annular seal member 2 may be formed from metal. As the metal, for example, gun metal can be exemplified.

Manufacturing Method

Figure 6A:
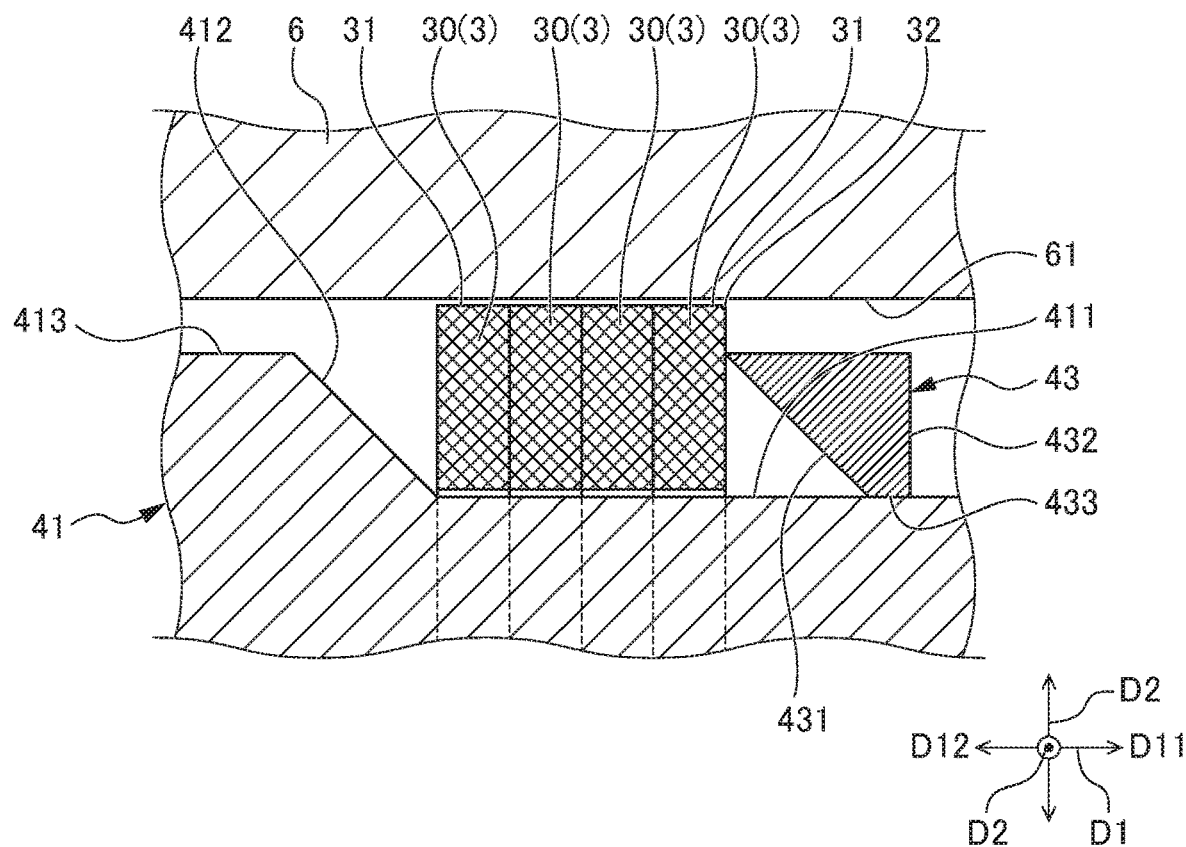
FIG. 6A is a view showing a process of the longitudinal cross-section of the annular seal member 2 sloping in one manufacturing method of the seal structure 1 of the first embodiment.
Figure 6B:
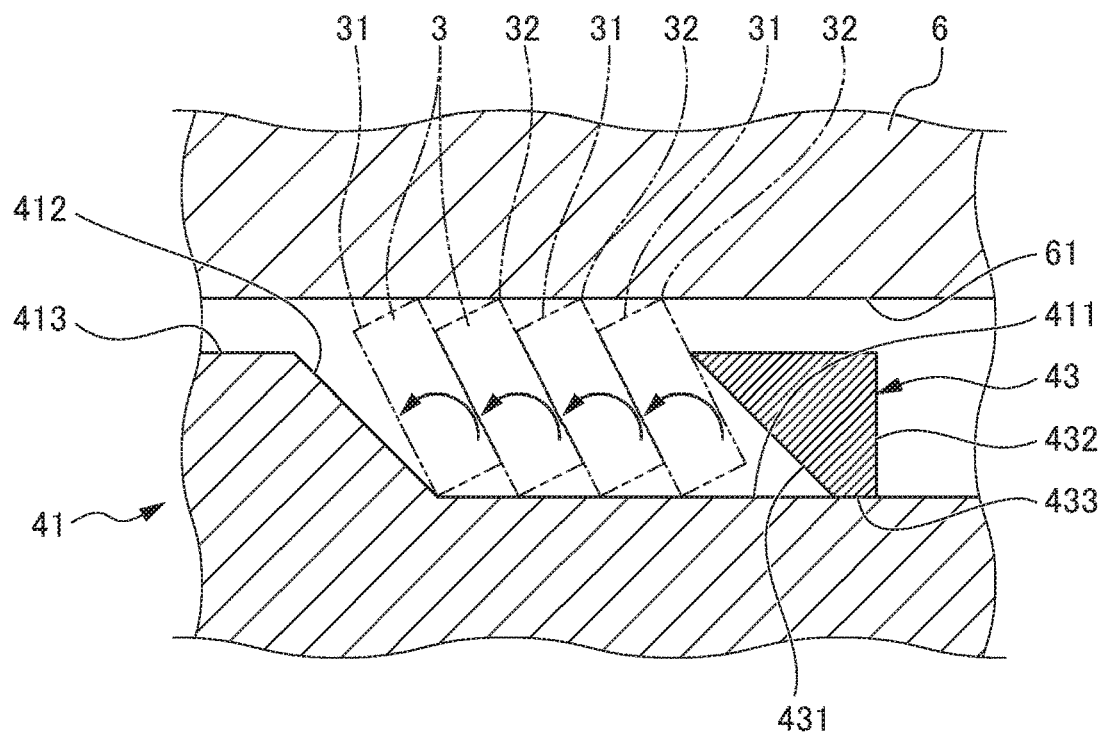
FIG. 6B is a view showing a process of the longitudinal cross-section of the annular seal member 2 sloping in one manufacturing method of the seal structure 1 of the first embodiment.

Next, one manufacturing method of the seal structure 1 of the first embodiment will be explained by referencing the drawings. FIGS. 6A and 6B are views showing the process of the longitudinal cross-section of the annular seal member 2 sloping in one manufacturing method of the seal structure 1 according to the first embodiment.

As shown in FIG. 6A and FIG. 5, prior to formation of the seal structure 1, the ring-shaped part 30 (3) is not sloping relative to the radial direction D2. The plurality of ring-shaped parts 30 and the sloped compression ring 43 are fit over the small diameter part 411 of the first main body 41 in order. The male thread part 442 of the second joining member 44 is made to penetrate in order through the male-thread-part through hole 423 of the second main body 42, sloped compression ring 43, and ring-shaped part 30. Subsequently, the male thread part 442 of the second joining member 44 and the first joint 415 (female thread part) of the first main body 41 are joined (threaded together). So that the seal groove 5 is thereby formed, the step surface 412 of the first main body 41 and the sloped face 431 of the sloped compression ring 43 approach in the axial direction D1.

In the process thereof, the plurality of ring-shaped parts 30 (3) is sandwiched between the step surface 412 of the first main body 41 and the sloped face 431 of the sloped compression ring 43, and slopes relative to the radial direction D2, following the slope of the step surface 412 of the first main body 41 and the sloped face 431 of the sloped compression ring 43. In other words, the ring-shaped part 30 (3) in a state in which the edge 31 opposing the inner peripheral wall 61 of the inner peripheral wall member 6 is parallel to the inner peripheral wall 6 of the inner peripheral wall member 6 in the longitudinal cross-section of the plurality of ring-shaped parts 3 when viewing in the radial direction D2 of the annular seal member 2 is compressed in the axial direction D1 and the longitudinal cross-section is made to slope relative to the radial direction D2.

It thereby forms the ring-shaped part 3 in a state in which, the one corner 32 among the two corners including the outer peripheral edge 31 opposing the inner peripheral wall 61 of the inner peripheral wall member 6 thereby forms the ring-shaped part 3 in the longitudinal cross-section of the plurality of ring-shaped parts 3 when viewed in the radial direction D2 of the annular seal member 2 is abutting the inner peripheral wall 61 of the inner peripheral wall member 6. As a result thereof, the annular seal member 2 configured from the plurality of sloped ring-shaped parts 3 is formed. The seal structure 1 of the first embodiment shown in FIG. 1 can be obtained in this way.

According to the seal structure 1 of the first embodiment, for example, the following such effects are exerted. The seal structure 1 of the embodiment is a seal structure 1 includes: the annular seal member 2 of annular shape having the outer periphery 21 and inner periphery 22; the shaft member 4 having seal groove 5 in which the side of the inner periphery 22 of the annular seal member 2 is arranged; and the inner peripheral wall member 6 having the internal space 62 encircled by the inner peripheral wall 61, and arranges in the internal space 62 the shaft member 4 on which the annular seal member 2 is arranged in the seal groove 5; and at least the side of the outer periphery 21 of the annular seal member 2 is formed by overlapping in the axial direction the plurality of the ring-shaped parts 3 which are closed or unclosed when viewed in the radial direction D2 orthogonal to the axial direction D1 of the annular seal member 2, and the one corner 32 among the two corners including the outer peripheral edge opposing the inner peripheral wall 61 of the inner peripheral wall member 6 in the longitudinal cross-section of the plurality of ring-shaped parts 3 is abutting the inner peripheral wall 61 of the inner peripheral wall member 6 at one side of the annular seal member 2 relative to the central axis C1 when viewing in the radial direction D2 of the annular seal member 2.

For this reason, according to the seal structure 1 of the first embodiment, a plurality of contact states close to line contact is formed between the inner peripheral wall 61 of the inner peripheral wall member 6 and the outer periphery 21 of the annular seal member 2. For this reason, since a plurality of seals of high contact pressure is formed, a high sealing property can be obtained. In addition, the annular seal member formed by a plurality of ring-shaped parts 3 having a quadrangular longitudinal cross-section overlapping in the axial direction D1 can be manufactured by a relatively easy processing method. The annular seal member 2 formed by a plurality of closed ring-shaped parts 3 overlapping in the axial direction D1 has flexibility compared to a solid form (solid material), and deformation in the radial direction D2 becomes relatively easy. For this reason, the sealing property is high.

In the seal structure 1 of the first embodiment, the annular seal member 2 formed by a plurality of closed ring-shaped parts 3 overlapping in the axial direction D1 easily deforms in the axial direction D1. For this reason, the scraping property of oil, etc. existing on the inner peripheral wall 61 of the inner peripheral wall member 6 is high.

In the seal structure 1 of the first embodiment, in a state joining the first joint 415 of the first main body 41 and the male thread part 442 of the second joining member 44, the seal groove 5 is formed by the step surface 412 of the first main body 41 and the small diameter part 411, and the sloped face 431 of the sloped compression ring 43.

For this reason, according to the seal structure 1 of the first embodiment, by joining the first main body 41 and the second joining member 44, it is possible to arrange the sloped plurality of ring-shaped parts 3 in the seal groove 5. By separating the first main body 41 and the second joining member 44, it is possible to retrieve the plurality of ring-shaped parts 3 arranged in the seal groove 5. For this reason, arranging of the plurality of ring-shaped parts 3 in the seal groove 5 of the shaft member 4 and retrieval of the plurality of ring-shaped parts 3 from the seal groove 5 are easy.

The manufacturing method of the seal structure 1 of the first embodiment compresses in the axial direction D1 the ring-shaped parts 3 in a state in which the outer peripheral edge 31 opposing the inner peripheral wall 61 of the inner peripheral wall member 6 is parallel to the inner peripheral wall 61 of the inner peripheral wall member 6 in a longitudinal cross-section of the plurality of ring-shaped parts 3 when viewing in the radial direction D2 of the annular seal member 2, thereby forming the ring-shaped parts 3 in a state in which one corner 32 among two corners including the outer peripheral edge 31 opposing the inner peripheral wall 61 of the inner peripheral wall member 6 in a longitudinal cross-section of the plurality of ring-shaped parts 3 when viewing in the radial direction D2 of the annular seal member 2 is abutting the inner peripheral wall 61 of the inner peripheral wall member 6.

The manufacture of the ring-shaped parts 30 in a state in which the outer peripheral edge 31 opposing the inner peripheral wall 61 of the inner peripheral wall member 6 is parallel to the inner peripheral wall 61 of the inner peripheral wall member 6 in the longitudinal cross-section of the plurality of ring-shaped parts 3 is relatively easy. By compressing in the axial direction D1 such ring-shaped parts having easy manufacture, it is possible to easily form ring-shaped parts 3 in a state in which the one corner 32 among two corners including the outer peripheral edge 31 opposing the inner peripheral wall 61 of the inner peripheral wall member 6 in the longitudinal cross-section of the plurality of ring-shaped parts 3 is abutting the inner peripheral wall 61 of the inner peripheral wall member 6.

Second Embodiment

Figure 9A:
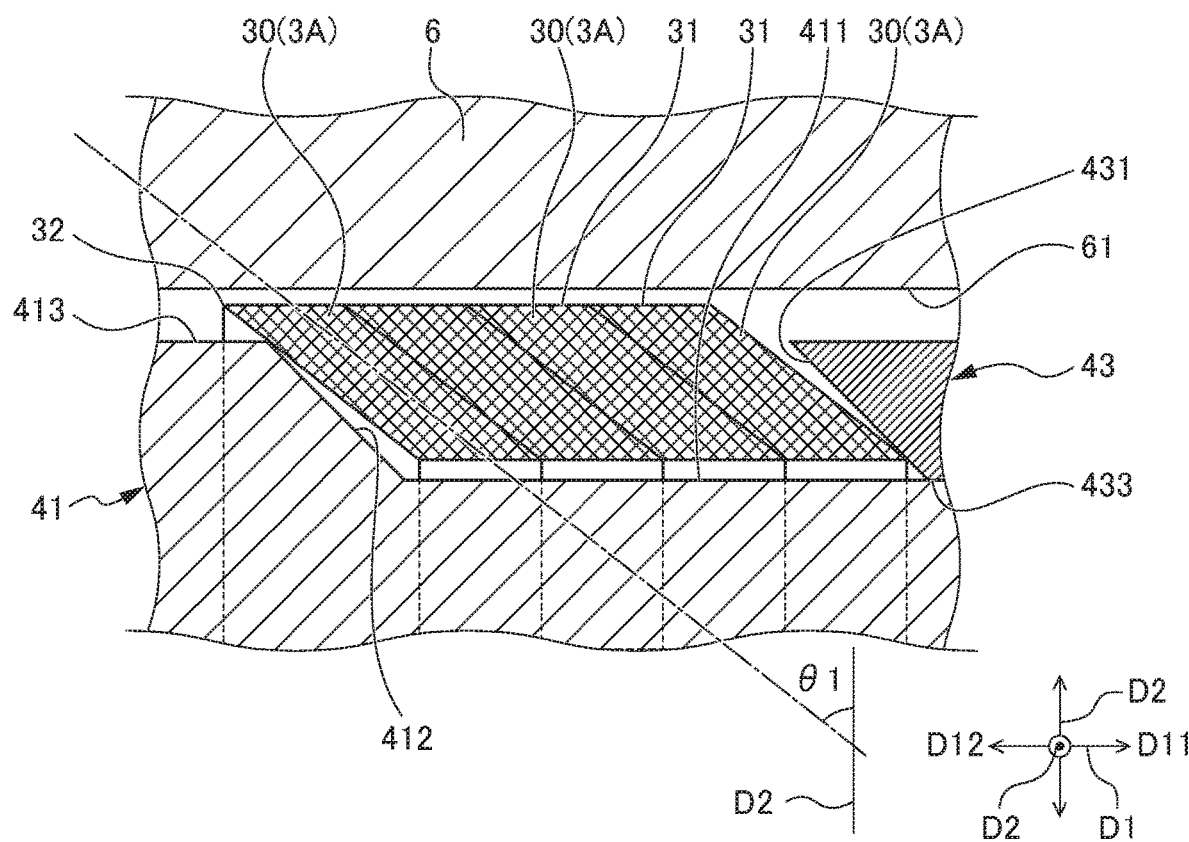
FIG. 9A is a view showing the process of the longitudinal cross section of the annular seal member 2A sloping in the manufacturing method of the seal structure 1A of the second embodiment (view corresponding to FIG. 6A)
Figure 9B:
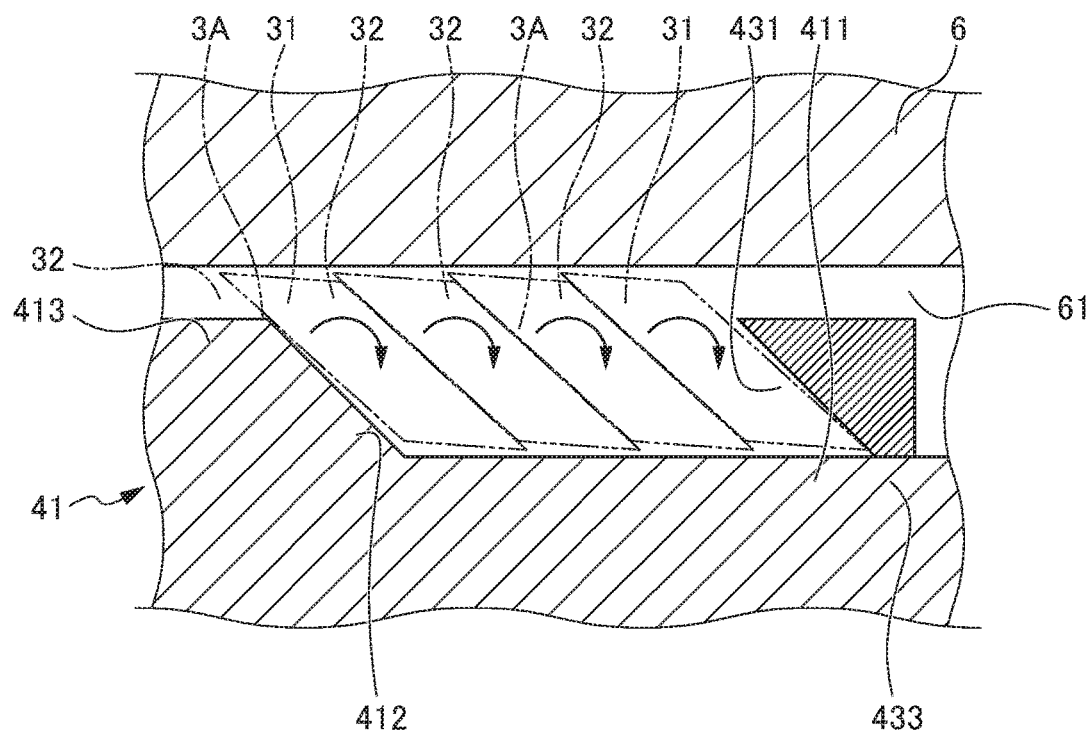
FIG. 9B is a view showing the process of the longitudinal cross section of the annular seal member 2A sloping in the manufacturing method of the seal structure 1A of the second embodiment (view corresponding to FIG. 6B)

Next, a seal structure 1A according to a second embodiment of the present invention will be explained by referencing the drawings. FIG. 7 is a partially enlarged view of a longitudinal cross-section of the seal structure 1A according to the second embodiment of the present invention (view corresponding to FIG. 2). FIG. 8 is an exploded cross-sectional view of the seal structure 1A of the second embodiment (view corresponding to FIG. 5). FIG. 9A is a view showing the process of the longitudinal cross-section of the annular seal member 2A sloping in the manufacturing method of the seal structure 1A of the second embodiment (view corresponding to FIG. 6A). FIG. 9B is a view showing the process of the longitudinal cross-section of the annular seal member 2A sloping in the manufacturing method of the seal structure 1A of the second embodiment (view corresponding to FIG. 6B). The second embodiment will be explained focusing on the points mainly differing from the first embodiment. The explanation for the first embodiment will be applied as appropriate to the points not particularly explained in the second embodiment. In addition, similar effects to the first embodiment are exerted also in the second embodiment.

As shown in FIGS. 7 and 8, in the seal structure 1A of the second embodiment, the longitudinal cross-section of the ring-shaped part 3A is a parallelogram on one side relative to the central axis C1 of the annular seal member 2A. In addition, as shown in FIGS. 7 to 9B, the slope angle θ1 (<90 degrees) which the longitudinal cross-section of the ring-shaped part 3A forms with the radial direction D2 is smaller after formation of the seal structure 1A (refer to FIG. 7) than prior to formation of the seal structure 1A (refer to FIG. 9A). In the longitudinal cross-sectional view, the edge 31 of the ring-shaped part 3A is parallel to the axial direction D1 prior to formation of the seal structure 1A (refer to FIG. 9A), but slopes relative to the axial direction D1 after formation of the seal structure 1A (refer to FIG. 7).

Third Embodiment

Figure 10A:
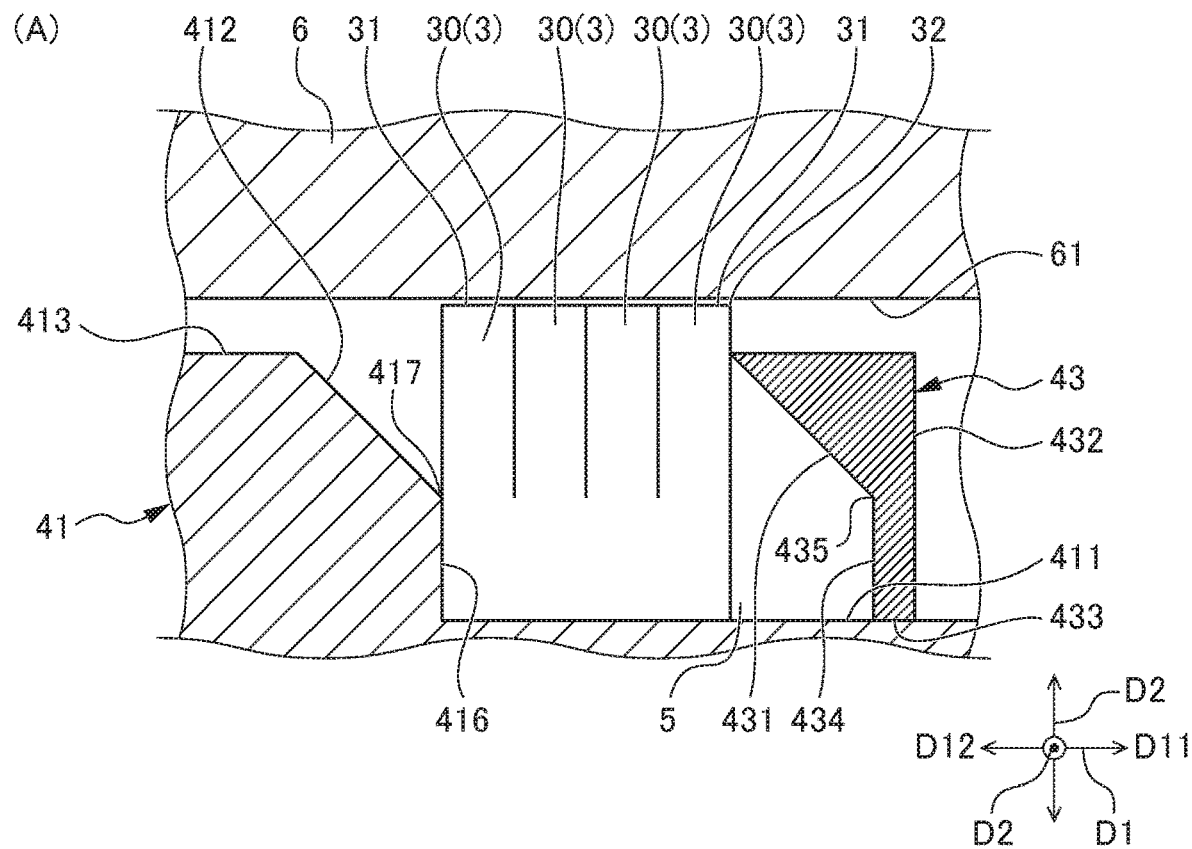
FIG. 10A is a view showing the process of the longitudinal cross-section of the annular seal member 2 sloping in a manufacturing method of a seal structure 1B according to a third embodiment (view corresponding to FIG. 6A)
Figure 10B:
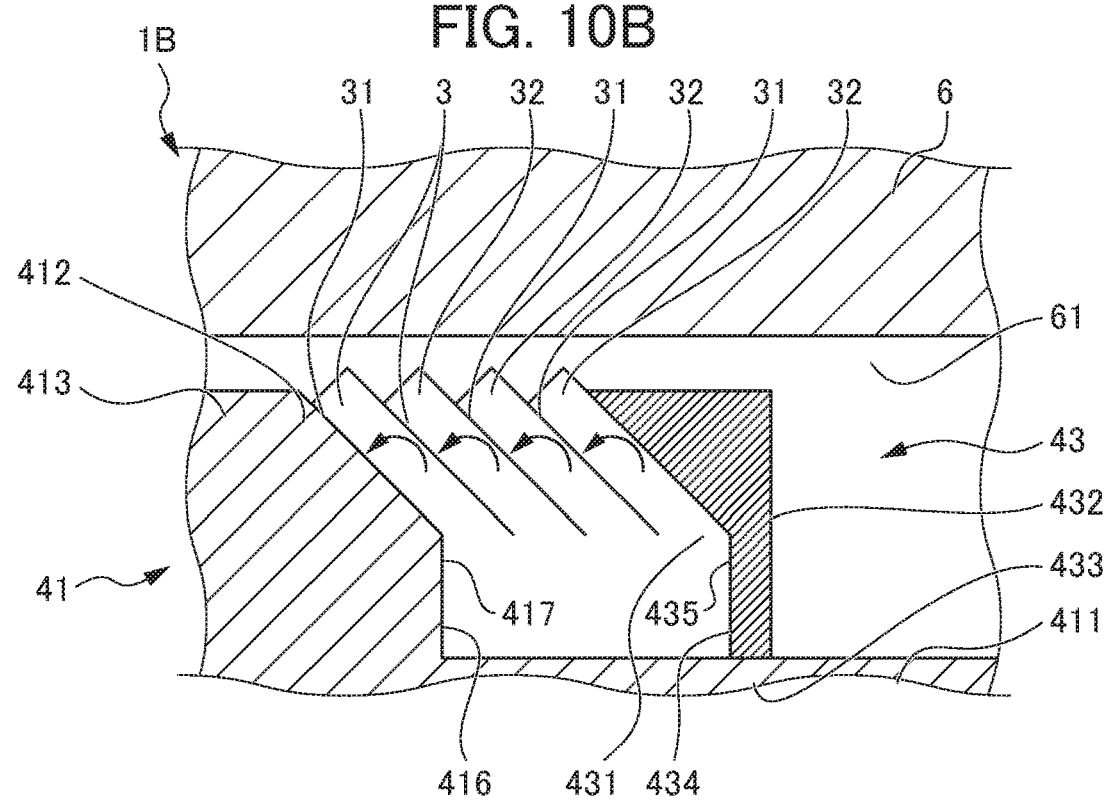
FIG. 10B is a view showing the process of the longitudinal cross-section of the annular seal member 2 sloping in a manufacturing method of a seal structure 1B according to a third embodiment (view corresponding to FIG. 2)

Next, a seal structure 1B according to a third embodiment of the present invention will be explained by referencing the drawings. FIG. 10A is a view showing the process of the longitudinal cross-section of the annular seal member 2 sloping in a manufacturing method of a seal structure 1B according to a third embodiment (view corresponding to FIG. 6A). FIG. 10B is a view showing the process of the longitudinal cross-section of the annular seal member 2 sloping in a manufacturing method of a seal structure 1B according to a third embodiment (view corresponding to FIG. 2). The third embodiment will be explained focusing on the points mainly differing from the first embodiment. The explanation for the first embodiment will be applied as appropriate to the points not particularly explained in the third embodiment. In addition, similar effects to the first embodiment are exerted also in the third embodiment.

In the seal structure 1 of the first embodiment, the longitudinal cross-section of the ring-shaped part 3 is a quadrangle spanning from the outer periphery 21 of the annular seal member 2 to the inner periphery and sloping relative to the radial direction D2. In contrast, in the seal structure 1B of the third embodiment, only the side of the outer periphery 21 in the annular seal member 2 is formed by a plurality of the ring-shaped part 3 overlapping in the axial direction D1 when viewed in the radial direction D2, as shown in FIG. 10B. The side of the inner periphery 22 of the annular seal member 2 is integral (block like) when viewed in the radial direction D2. In other words, in the present invention, it is sufficient if at least the side of the outer periphery 21 in the annular seal member 2 is formed by a plurality of the ring-shaped parts 3 overlapping in the axial direction D1 when viewed in the radial direction D2.

The seal structure 1B of the third embodiment, for example, is manufactured as shown in FIGS. 10A and 10B. Specifically, a second step surface 416 which indents in parallel to the radial direction D2 is provided between an inside end 417 of the step surface 412 of the first main body 41 and the small diameter part 411. A pressure surface 434 extending in parallel to the radial direction D2 is provided between the inside end 435 of the sloped face 431 of the sloped compression ring 43 and the inner circumferential face 433.

So that the seal groove 5 is formed, the step surface 412 of the first main body 41 and the sloped face 431 of the sloped compression ring 43 approach in the axial direction D1, and the second step surface 416 of the first main body 41 and the pressure surface 434 of the sloped compression ring 43 approach in the axial direction D1. In the process thereof, a plurality of the ring-shaped parts 30 (3) provided to only the side of the outer periphery 21 of the annular seal member 2 is sandwiched between the step surface 412 of the first main body 41 and the sloped face 431 of the sloped compression ring 43, and slopes relative to the radial direction D2 following the slopes of the step surface 412 of the first main body 41 and the sloped face 431 of the sloped compression ring 43. In other words, the ring-shaped part 30 (3) in a state in which the outer peripheral edge 31 opposing the inner peripheral wall 61 of the inner peripheral wall member 6 is parallel to the inner peripheral wall 61 of the inner peripheral wall member 6 in the longitudinal cross-section of the plurality of ring-shaped parts 3 when viewing the radial direction D2 of the annular seal member 2 is compressed in the axial direction D1, whereby the longitudinal cross-section is made to slope relative to the radial direction D2. In the process thereof, the side of the integral inner periphery 22 of the annular seal member 2 is sandwiched by the second step surface 416 of the first main body 41 and the pressure surface 434 of the sloped compression ring 43.

Fourth Embodiment

Figure 11A:
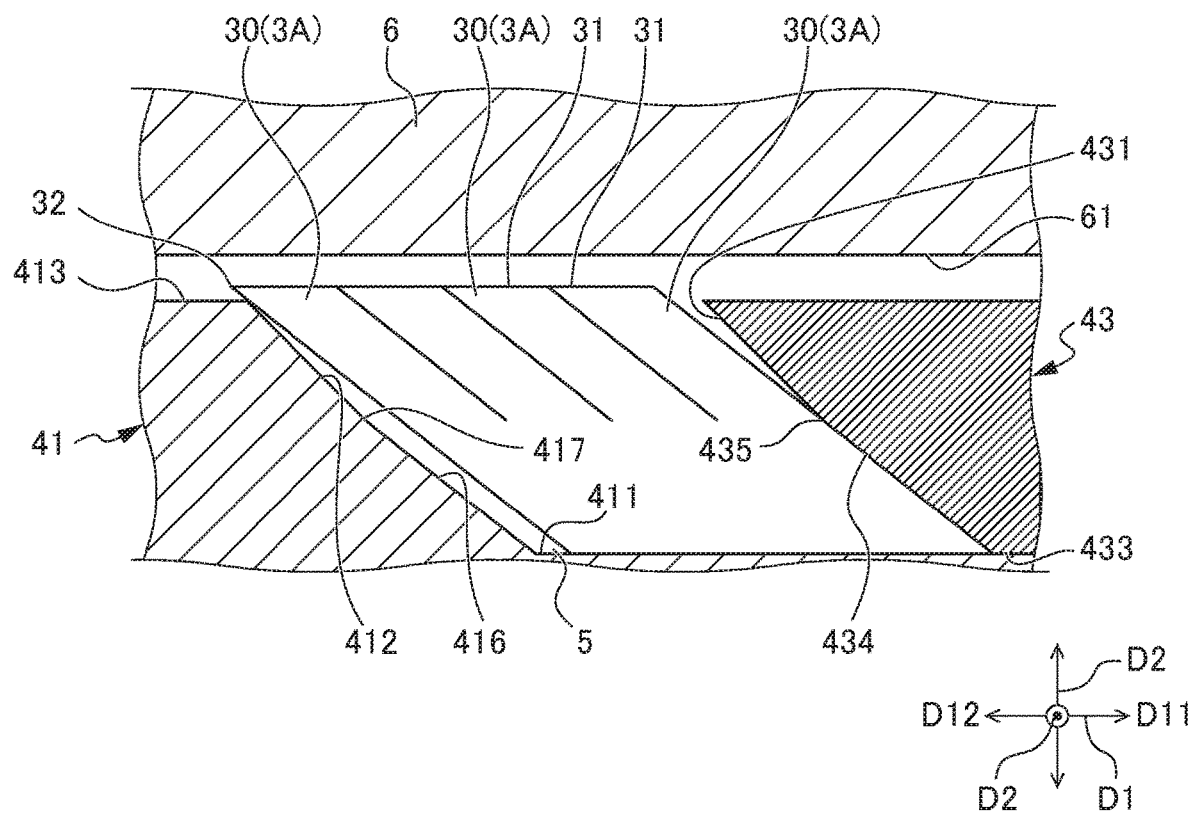
FIG. 11A is a view showing the process of the longitudinal cross-section of the annular seal member 2 sloping in a manufacturing method of a seal structure 1C according to a fourth embodiment (view corresponding to FIG. 9A)
Figure 11B:
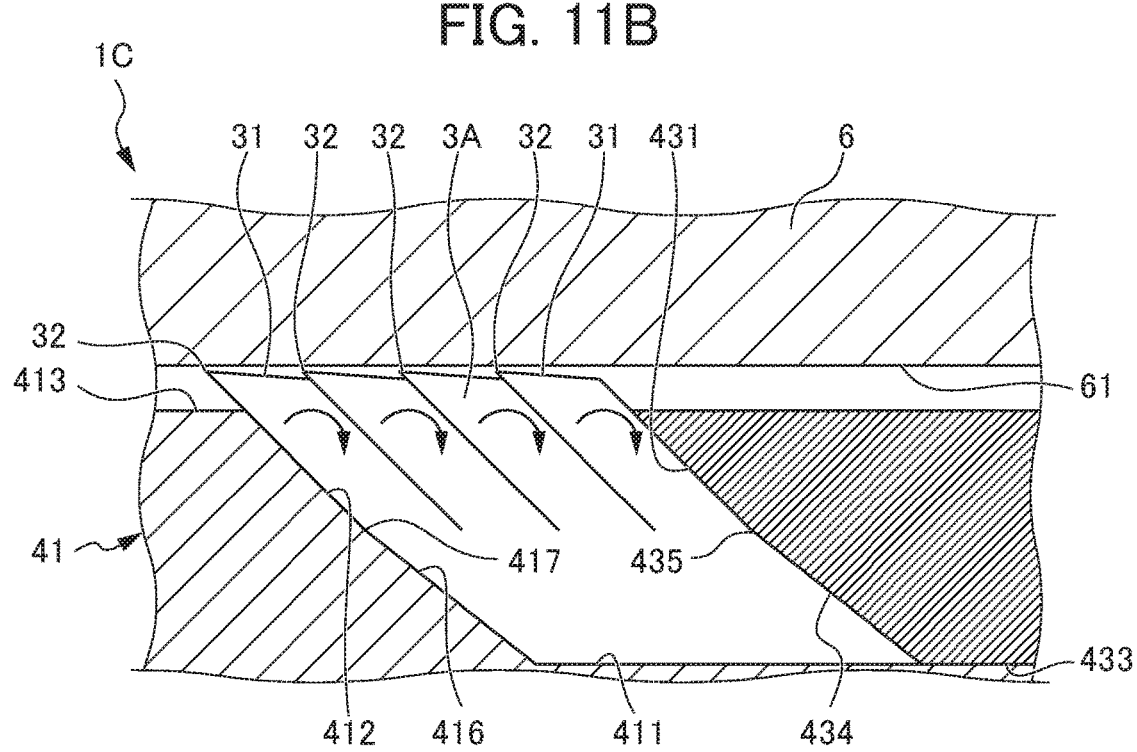
FIG. 11B is a view showing the process of the longitudinal cross-section of the annular seal member 2 sloping in a manufacturing method of a seal structure 1C according to the fourth embodiment (view corresponding to FIG. 7).

Next, a seal structure 1C according to a fourth embodiment of the present invention will be explained by referencing the drawings. FIG. 11A is a view showing the process of the longitudinal cross-section of the annular seal member 2 sloping in a manufacturing method of a seal structure 1C according to a fourth embodiment (view corresponding to FIG. 9A). FIG. 11B is a view showing the process of the longitudinal cross-section of the annular seal member 2 sloping in a manufacturing method of a seal structure 1C according to a fourth embodiment (view corresponding to FIG. 7). The fourth embodiment will be explained focusing on the points mainly differing from the second embodiment and third embodiment. The explanation for the second embodiment and third embodiment will be applied as appropriate to the points not particularly explained in the fourth embodiment. In addition, similar effects to the second embodiment and third embodiment are exerted also in the fourth embodiment.

In the seal structure 1A of the second embodiment, the longitudinal cross-section of the ring-shaped part 3 is a quadrangle spanning from the outer periphery 21 of the annular seal member 2 to the inner periphery and sloping relative to the radial direction D2. In contrast, in the seal structure 1C of the fourth embodiment, only the side of the outer periphery 21 in the annular seal member 2 is formed by a plurality of the ring-shaped parts 3 overlapping in the axial direction D1 when viewed in the radial direction D2, as shown in FIG. 11B. The side of the inner periphery 22 of the annular seal member 2 is integral (block like) when viewed in the radial direction D2.

The seal structure 1C of the fourth embodiment is manufactured as shown in FIGS. 11A and 11B, for example. Specifically, the second step surface 416 which slopes at a different angle than the step surface 412 is provided between the inside end 417 of the step surface 412 of the first main body 41 and the small diameter part 411. The pressure surface 434 which slopes at a different angle than the sloped face 431 is provided between the inside end 435 of the sloped face 431 of the sloped compression ring 43 and the inner circumferential face 433. It should be noted that, in FIGS. 11A and 11B, the difference in the aforementioned slope angles is depicted to be very small.

So that the seal groove 5 is formed, the step surface 412 of the first main body 41 and the sloped face 431 of the sloped compression ring 43 approach in the axial direction D1, and the second step surface 416 of the first main body 41 and the pressure surface 434 of the sloped compression ring 43 approach in the axial direction D1. In the process thereof, a plurality of the ring-shaped parts 30 (3) provided to only the side of the outer periphery 21 of the annular seal member 2 is sandwiched between the step surface 412 of the first main body 41 and the sloped face 431 of the sloped compression ring 43, and slopes relative to the radial direction D2 following the slopes of the step surface 412 of the first main body 41 and the sloped face 431 of the sloped compression ring 43. In other words, the ring-shaped part 30 (3) in a state in which the outer peripheral edge 31 opposing the inner peripheral wall 61 of the inner peripheral wall member 6 is parallel to the inner peripheral wall 61 of the inner peripheral wall member 6 in the longitudinal cross-section of the plurality of ring-shaped parts 3 when viewing the radial direction D2 of the annular seal member 2 is compressed in the axial direction D1, whereby the longitudinal cross-section is made to slope relative to the radial direction D2. In the process thereof, the side of the integral inner periphery 22 of the annular seal member 2 is sandwiched by the second step surface 416 of the first main body 41 and the pressure surface 434 of the sloped compression ring 43.

Preferred embodiments of the present invention have been explained above. However, the present invention is not to be limited to the aforementioned embodiments, and can be implemented in various forms.

Other Modified Examples

The longitudinal cross-section of the ring-shaped part 3 is a rectangle in the first embodiment, and is a parallelogram in the second embodiment; however, it is not limited thereto, and may be other quadrangles. The outer peripheral edge 31 and inner peripheral side 36 are not limited to linear, and may be curved or uneven shape. At least the side of the outer periphery 21 of the annular seal member may form a spiral shape by a plurality of the ring-shaped parts which are unclosed when viewed in the radial direction D2 being continuous in the axial direction D1.

In the seal structure 1 of the aforementioned embodiments, the area on the inner diameter side in the radial direction D2 of the surface of the ring-shaped part 3 on the side of the first axial direction D11 is pressed by the sloped face 431 of the sloped compression ring 43. However, on one side of the annular seal member 2 relative to the central axis C1, in the case of focusing on the longitudinal cross-section of the ring-shaped part 3, the surface positioned at the center in the radial direction D2 of the surface on the side of the first axial direction D11 may be pressed by the sloped face 431, etc. of the sloped compression ring 43. By changing the position at which pressing, it is possible to substantially change the surface area which freely bends, among the area in the radial direction D2 of the ring-shaped part 3. It is thereby possible to change the degree of strength of the sealing property.

In the seal structure 1 of the aforementioned embodiments, the seal groove 5 of the shaft member 4 is formed by joining the first main body 41 and the second joining member 44. In contrast, the shaft member 4 may be configured integrally. In this case, it is not possible to arrange the annular seal member 2 in the seal groove 5 using the joining process of the first main body 41 and second joining member 44. For this reason, the ring-shaped part 3 is arranged in the seal groove 5, by configuring to allow the ring-shaped part 3 to deform, and climb over the portion around the seal groove 5 of the shaft member 4.

In the embodiments, the female thread part and male thread part may be reversed in the joining structure between the first joint 415 of the first main body 41 and the male thread part 442 of the second joining member 44. These may be a joining structure other than screw threads.

EXPLANATION OF REFERENCE NUMERALS

1, 1A seal structure
2, 2A annular seal member 21 outer periphery
22 inner periphery
3, 3A ring-shaped part
31 outer peripheral edge (side)
32 one corner
4 shaft member
5 seal groove
6 inner peripheral wall member
61 inner peripheral wall
62 internal space
C1 central axis
D1 axial direction
D2 radial direction

The invention claimed is:

1. A seal structure comprising:
an annular seal member of ring shape having an outer periphery and an inner periphery, at least a side of the outer periphery being formed by a plurality of ring-shaped parts overlapped in an axial direction of the annular seal member, the ring-shaped parts being closed or unclosed when viewed in a radial direction orthogonal to the axial direction;
a shaft member having a seal groove in which a side of the inner periphery of the annular seal member is disposed; and
an inner peripheral wall member having an internal space encircled by an inner peripheral wall, and arranging in the internal space the shaft member in which the annular seal member is disposed in the seal groove,
wherein a longitudinal cross-section of each of the ring-shaped parts is a quadrangle which spans from the outer periphery of the annular seal member to the inner periphery thereof and slopes relative to the radial direction,
wherein each of the ring-shaped parts has two corners at an outer side thereof relative to a central axis of the annual seal member in a longitudinal cross section of the annual seal member, each of the two corners being formed with a straight side extending in the radial direction and a straight side extending in the axial direction of the quadrangle, and
wherein a sloped compression ring and a step surface of the shaft member are movable to approach each other in the axial direction to allow the quadrangle to slope relative to the radial direction, such that only one corner among the two corners abuts to be substantially in line contact with the inner peripheral wall of the inner peripheral wall member when viewing in the radial direction of the annual seal member, and an entirety of a straight side of a ring-shaped part, extending in the radial direction, abuts the step surface.

2. The seal structure according to claim 1, wherein a side of each of the ring-shaped parts opposing the inner peripheral wall of the inner peripheral wall member in the longitudinal cross-section of each of the ring-shaped parts when viewed in the radial direction of the annular seal member is sloping relative to the axial direction.

3. The seal structure according to claim 1, wherein the annular seal member consists of fluororesin.

4. A manufacturing method of a seal structure that includes:
an annular seal member of ring shape having an outer periphery and an inner periphery, at least a side of the outer periphery being formed by a plurality of ring-shaped parts overlapped in an axial direction of the annular seal member, the ring-shaped parts being closed or unclosed when viewed in a radial direction orthogonal to the axial direction;
a shaft member having a seal groove in which a side of the inner periphery of the annular seal member is disposed; and
an inner peripheral wall member having an internal space encircled by an inner peripheral wall, and arranging in the internal space the shaft member in which the annular seal member is disposed in the seal groove,
wherein a longitudinal cross-section of each of the ring-shaped parts is a quadrangle which spans from the outer periphery of the annular seal member to the inner periphery thereof and slopes relative to the radial direction, and
wherein each of the ring-shaped parts has two corners at an outer side thereof relative to a central axis of the annual seal member in a longitudinal cross section of the annual seal member, each of the two corners being formed with one straight side extending in the radial direction and one straight side extending in the axial direction of the quadrangle,
the method comprising:
compressing in the axial direction the ring-shaped parts in a state in which a side of each of the ring-shaped parts opposing the inner peripheral wall of the inner peripheral wall member is parallel to the inner peripheral wall of the inner peripheral wall member, in a longitudinal cross-section of each of the ring-shaped parts, at outer side relative to a central axis of the annular seal member, when viewed in the radial direction of the annular seal member; and
thereby forming each of the ring-shaped parts in a state in which a sloped compression ring and a step surface of the shaft member which are movable to approach each other in the axial direction allows the quadrangle to slope relative to the radial direction, such that only one corner among the two corners abuts to be substantially in line contact with the inner peripheral wall of the inner peripheral wall member, when viewed in the radial direction of the annular seal member, and an entirety of a straight side of a ring-shaped part, extending in the radial direction, abuts the step surface.

5. The manufacturing method of the seal structure according to claim 4, wherein the annular seal member consists of fluororesin.

* * * * *